C. H. EGGLESTON.
Seed-Dropper.
No. 46,889.
Patented Mar. 21, 1865.
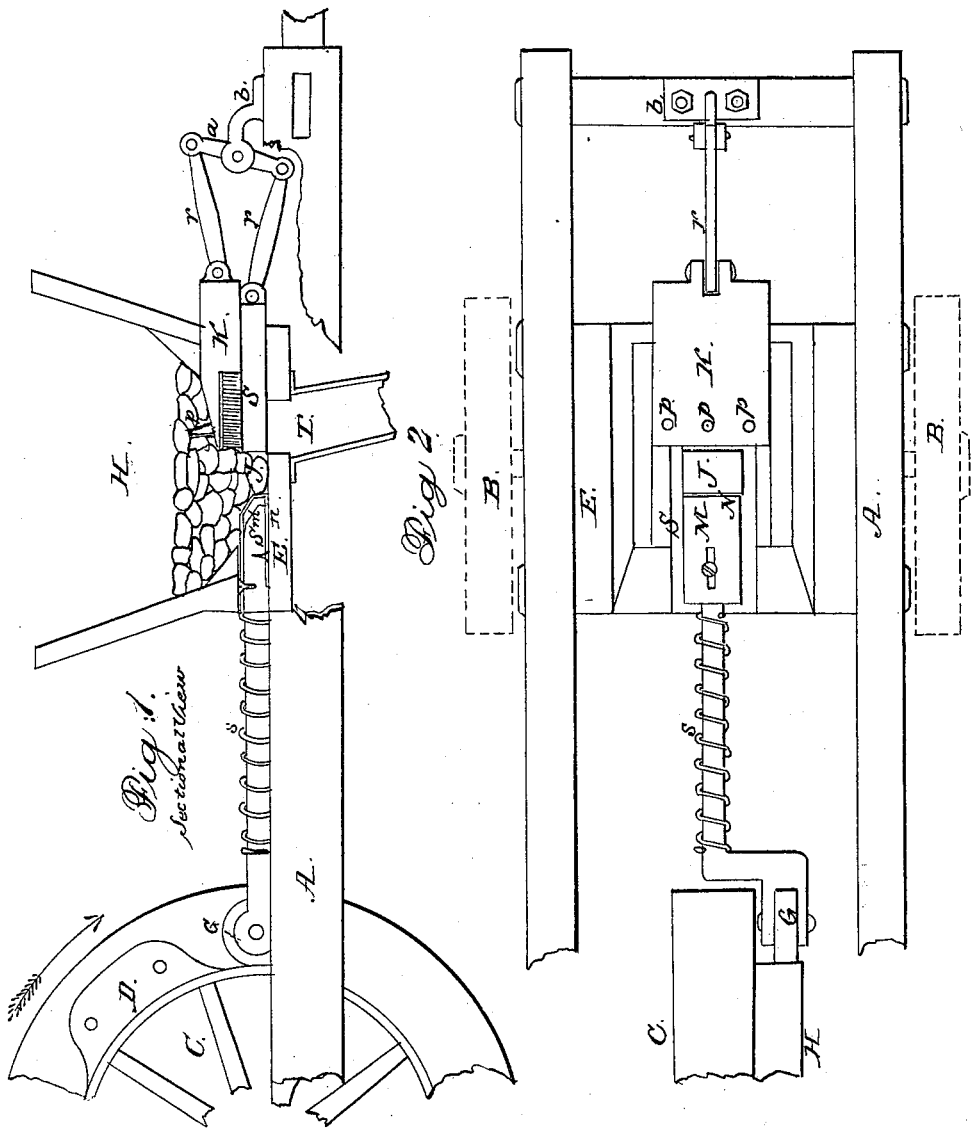
WITNESSES:
Frank Black
George Johnson
INVENTOR:
Charles H. Eggleston

UNITED STATES PATENT OFFICE.

CHARLES H. EGGLESTON, OF MARSHALL, MICHIGAN.

IMPROVEMENT IN SEEDING-MACHINES.

Specification forming part of Letters Patent No. 46,889, dated March 21, 1865.

*To all whom it may concern:*

Be it known that I, CHARLES H. EGGLESTON, of the city of Marshall, in the county of Calhoun and State of Michigan, have invented certain new and useful Improvements in Seed-Planting Machines; and I do hereby declare that the following is a full, clear, and exact description of the same, reference being had to the annexed drawings, making a part of this specification, in which—

Figure 1 is a side view, partly sectional, of my improvement. Fig. 2 is a plan or top view of the same.

Similar letters of reference indicate corresponding parts in the several figures.

This invention consists in the use of a connected "seed-cup slide" and brush, in combination with an adjustable spring and guard-plate, the several parts being operated and arranged relatively with each other, as hereinafter described.

To enable those skilled in the art to fully understand and construct my invention, I will now proceed to describe it.

The frame of the machine as I usually construct it is represented at A broken to exhibit the hopper and dropping devices in section. Two wheels, B B, in broken lines, are hung to a stationary axle, and support this frame in front, and one broad-rimmed wheel, C, which acts as the covering-wheel, and above which the driver's seat (not shown) is generally placed, is keyed to the middle of an axle which revolves in bearings in the said frame and supports it behind.

The cams which I use to operate my dropping apparatus, one of which is shown at D, are ranged at any requisite distance apart on the face of a circular rim, R, which rim is cast on or otherwise attached to the side of the covering-wheel C.

H represents the hopper containing the seed. It is fastened to a platform, E, and this platform is perforated opposite the seed-tube T, which conveys the seed into the furrow in the ground in the usual manner.

The seed-slide is indicated at S. It travels between guides over the platform E, and has a stem around which is placed a spiral spring, $s$, to preserve a constant bearing of the attached anti-friction roller G against the cammed rim R.

J is the measuring seed-cup, formed by cutting a proper-sized opening through the seed-slide behind the opening into the seed-tube T.

A brush-slide, K, provided with one or more pins or stirrers, $p\ p\ p$, to agitate the seed, is placed above the seed-slide, and the two are connected by jointed rods $r\ r$ to a vibrating arm, $a$, which is pivoted to the bracket $b$ in such manner that the brush will strike off the seed above the cup J when both slides are in motion.

To enlarge or contract the capacity of the seed-cavity J, and also to prevent seed from jamming between the edge of the seed-cup and the brush, I attach a flat slotted steel spring, M, to the upper side of the seed-slide. This spring is made very elastic, and one end is bent over partially into the seed-cup, with space to act, as may be clearly seen in Fig. 1. Should a seed jam, the end of the spring will be depressed and form an incline, up which it will be driven by the action of the brush. Small seeds are prevented from working under the bent end of the spring M by means of what I term a "guard-plate," N, on the under side of the seed-slide, which has a bent lip at one end that laps past the bent end of the spring, and is provided with a slot to adjust it.

The operation is as follows: As the covering-wheel C revolves a reciprocating motion is communicated by the cams or any other analogous device to the seed-slide S and the brush K, the seed in the hopper which fills the cup J being carried forward with the slide until it is emptied into the seed-tube T, where it is conveyed into the furrow, and covered by the wheel C. As the seed-slide is moving forward the brush-slide K is moving backward, striking off the seed above the cup and agitating and loosening the seed above for the next filling on the return motion of the seed-slide.

I do not wish to confine myself to any particular mode of operating the slides nor to any particular style of frame or its attachments for my arrangement for dropping the seed is equally as applicable to a gardener's hand-machine for small seeds as it is for planting two rows of corn by horses.

I am well aware that striking off the seed in a cell by brushes, and that agitating the seed to prevent its jamming together by means similar to mine, are in themselves no novelty; but I am not aware that a simultaneous action of a seed-slide and brush in connection with a spring and guard to prevent choking has ever before been used. I therefore disclaim broadly the use of a brush and stirrer in connection with seed-slides; but What I do claim, and desire to secure by Letters Patent, is—

The employment of the seed-slide S and brush-slide K when connected together substantially as described, in combination with the spring M and guard-plate N, as and for the purposes specified.

CHARLES H. EGGLESTON.

Witnesses:
FRANK BEACH,
GEORGE JOHNSON.